US012613604B2

(12) United States Patent
Yan

(10) Patent No.:  US 12,613,604 B2
(45) Date of Patent:          Apr. 28, 2026

(54) DISPLAY PANEL AND TERMINAL DEVICE INCLUDING PIXEL UNIT ARRAY AND TOUCH ELECTROMAGNETIC ANTENNA GROUP

(71) Applicant: Guangzhou China Star Optoelectronics Semiconductor Display Technology Co., Ltd., Guangzhou (CN)

(72) Inventor: Sen Yan, Guangzhou (CN)

(73) Assignee: GUANGZHOU CHINA STAR OPTOELECTRONICS SEMICONDUCTOR DISPLAY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 17/785,064

(22) PCT Filed: May 18, 2022

(86) PCT No.: PCT/CN2022/093569
§ 371 (c)(1),
(2) Date: Dec. 1, 2024

(87) PCT Pub. No.: WO2023/206650
PCT Pub. Date: Nov. 2, 2023

(65) Prior Publication Data
US 2025/0085825 A1       Mar. 13, 2025

(30) Foreign Application Priority Data
Apr. 26, 2022    (CN) .......................... 202210446297.9

(51) Int. Cl.
*G06F 3/046*          (2006.01)

(52) U.S. Cl.
CPC ..................................... *G06F 3/046* (2013.01)

(58) Field of Classification Search
CPC ....................................................... G06F 3/046
See application file for complete search history.

(56) References Cited

U.S. PATENT DOCUMENTS 9,176,622 B1      11/2015  Jin et al.
2015/0277633 A1*  10/2015  Jiang ................. G02F 1/133512
                                             345/174

FOREIGN PATENT DOCUMENTS

CN          103092446 A      5/2013
CN          103941952 A      7/2014
                    (Continued)

OTHER PUBLICATIONS

Chinese Office Action issued in corresponding Chinese Patent Application No. 202210446297.9 dated Apr. 25, 2023, pp. 1-6.
(Continued)

*Primary Examiner* — Lisa S Landis
(74) *Attorney, Agent, or Firm* — Nathan & Associates Patent Agents Ltd.; Menachem Nathan

(57)       ABSTRACT
A display panel and a terminal device are provided. The display panel includes a pixel unit array and a touch electromagnetic antenna group. The touch electromagnetic antenna group includes a plurality of first electromagnetic antenna groups arranged along a first direction and a plurality of second electromagnetic antenna groups arranged along a second direction. At least two of the first electromagnetic induction antennas in the first electromagnetic antenna group are electrically connected in the non-display region. At least two of the second electromagnetic induction antennas in the second electromagnetic antenna group are electrically connected in the non-display region.

20 Claims, 2 Drawing Sheets

(56)     References Cited

FOREIGN PATENT DOCUMENTS

| CN | 108415623 A | 8/2018 |
|----|-------------|--------|
| CN | 109491554 A | 3/2019 |
| CN | 109491555 A | 3/2019 |
| CN | 111413815 A | 7/2020 |
| CN | 111427208 A | 7/2020 |
| CN | 112331708 A | 2/2021 |
| CN | 113672119 A | 11/2021 |
| JP | 2008180954 A | 8/2008 |
| JP | 2017220187 A | 12/2017 |

OTHER PUBLICATIONS

International Search Report in International application No. PCT/CN2022/093569,mailed on Nov. 30, 2022.
Written Opinion of the International Search Authority in International application No. PCT/CN2022/093569,malled on Nov. 30, 2022.

* cited by examiner

DISPLAY PANEL AND TERMINAL DEVICE INCLUDING PIXEL UNIT ARRAY AND TOUCH ELECTROMAGNETIC ANTENNA GROUP

TECHNICAL FILED

The present application relates to the field of display technology, and in particular, to a display panel and a terminal device.

BACKGROUND

The touch screen industry has successively undergone different types of sensing development such as sonic sensing, infrared sensing, resistive sensing, capacitive sensing, electromagnetic induction sensing, etc. The touch screen industry is a relatively mature industry now. The electromagnetic induction touch technology has many advantages such as accurate positioning, sensitivity, original pen display, can be operated normally even be scratched, good positioning uniformity, not affected by accidental touch, and strong anti-interference ability of the antenna.

In the related art, the electromagnetic induction touch technology uses an electromagnetic pen to emit electromagnetic signals, and then interacts with an electromagnetic induction board behind a display screen. The electromagnetic induction board behind a touch screen will sense the electromagnetic signal of the electromagnetic pen when the electromagnetic pen is close to the touch screen. According to a received signal of the antenna array in a horizontal direction and a vertical direction, a coordinate position of the electromagnetic pen is obtained by calculating a difference of the magnetic flux. Since the electromagnetic pen has a horizontal pressure sensor, a pressure is transmitted to the pressure sensor through a pen core after the pen tip is stressed when the user writes with the electromagnetic pen. A change of the pressure causes the electromagnetic signal sent by the electromagnetic pen to change, wherein the electromagnetic induction board shows different pressure sensitivity according to an induction signal.

However, most of the antenna designs currently on the market are electromagnetic films with thicker films. A resistance of one channel is several tens of ohms. According to the design idea of the electromagnetic film in the related art, a channel is composed of a single antenna, causes the resistance of one channel will reach thousands of ohms, so the electromagnetic signal is very weak, and an external chip cannot detect the electromagnetic signal, resulting in touch control function fails.

SUMMARY OF INVENTION

Technical Problem

The present application mainly addresses the technical problem that the touch function fails due to weak electromagnetic signals.

Solutions to Problems

Technical Solutions

In view of this, the present application proposes a display panel and a terminal device, wherein at least two first electromagnetic induction antennas and at least two second electromagnetic induction antennas are connected in parallel in a non-display region, a resistance of the antenna channel is reduced, an effect of parallel connection of the antenna is improved, and a strength of the electromagnetic signal is enhanced, thereby reducing a probability of touch failure while increasing an aperture ratio of the display panel.

According to one aspect of the present application, a display panel is provided. The display panel includes a display region and a non-display region, wherein a pixel unit array and a touch electromagnetic antenna group are disposed in the display region; wherein the pixel unit array includes a plurality of pixel units arranged in an array; wherein the touch electromagnetic antenna group includes a plurality of first electromagnetic antenna groups arranged along a first direction and a plurality of second electromagnetic antenna groups arranged along a second direction, and wherein the second electromagnetic antenna group is insulated from the first electromagnetic antenna group;

wherein each first electromagnetic antenna group includes at least two first electromagnetic induction antennas, wherein the first electromagnetic induction antennas are disposed adjacent to the pixel unit in the display region, and wherein at least two of the first electromagnetic induction antennas in the first electromagnetic antenna group are electrically connected in the non-display region; and wherein each second electromagnetic antenna group includes at least two second electromagnetic induction antennas, wherein the second electromagnetic induction antennas are disposed adjacent to the pixel unit in the display region, and wherein at least two of the second electromagnetic induction antennas in the second electromagnetic antenna group are electrically connected in the non-display region.

Further, at least two of the first electromagnetic induction antennas are arranged at intervals along the first direction in the first electromagnetic antenna group.

Further, a distance between each first electromagnetic antenna group and the adjacent first electromagnetic antenna group is greater than a distance between each first electromagnetic induction antenna and the adjacent first electromagnetic induction antenna, and wherein a distance between each second electromagnetic antenna group and the adjacent second electromagnetic antenna group is greater than a distance between each second electromagnetic induction antenna and the adjacent second electromagnetic induction antenna.

Further, at least two of the second electromagnetic induction antennas are arranged at intervals along the second direction in the second electromagnetic antenna group, wherein the second direction is perpendicular to the first direction.

Further, the first electromagnetic antenna group includes at least one first connection line, wherein the at least one first connection line is electrically connected to each of the first electromagnetic induction antennas in the corresponding first electromagnetic antenna group, and wherein for the first electromagnetic induction antenna provided with the first connection line, a plurality of first connection lines corresponding to the first electromagnetic induction antenna are arranged at intervals along the second direction.

Further, the second electromagnetic antenna group includes at least one second connection line, wherein the at least one second connection line is electrically connected to each second electromagnetic induction antenna of a corresponding second electromagnetic antenna group, and wherein for the second electromagnetic induction antenna provided with the second connection line, a plurality of second connection lines corresponding to the second electromagnetic induction antenna are arranged at intervals along the first direction.

Further, each of the first sensing antennas is partially positioned in the display region, wherein the lengths of the first sensing antennas positioned in the display region are equal.

Further, each of the second sensing antennas is partially positioned in the display region, wherein the lengths of the second sensing antennas positioned in the display region are equal.

Further, the display panel further comprises a first peripheral line, wherein at least two of the first electromagnetic induction antennas are electrically connected to the first peripheral line in the first electromagnetic antenna group in the non-display region.

Further, a width of the first peripheral line is greater than a width of each of the first electromagnetic induction antennas, wherein a line direction of the first peripheral line is perpendicular to a line direction of the first electromagnetic induction antenna.

Further, the display panel further comprises a second peripheral line, wherein at least two of the second electromagnetic induction antennas are electrically connected to the second peripheral line in the second electromagnetic antenna group in the non-display region.

Further, a width of the second peripheral line is greater than a width of each of the second electromagnetic induction antennas, wherein a line direction of the second peripheral line is perpendicular to a line direction of the first electromagnetic induction antenna.

Further, a touch chip is disposed in the non-display region, and the touch chip is electrically connected to each of the first electromagnetic induction antennas and each of the second electromagnetic induction antennas.

Further, the display panel includes a plurality of antenna loops, each of the antenna loops includes at least two first electromagnetic induction antennas or at least two second electromagnetic induction antennas.

Further, each of the pixel units comprises a thin film transistor, each of the first electromagnetic induction antennas and a source electrode or a drain electrode of a corresponding thin film transistor are disposed on a same layer, and each of the second electromagnetic induction antennas and a gate electrode of a corresponding thin film transistor are disposed on a same layer.

Further, a through hole is provided between each of the first electromagnetic induction antennas and the corresponding first connection line, wherein each of the first electromagnetic induction antennas is electrically connected to the corresponding first connection line through the through hole.

Further, a through hole is provided between each of the second electromagnetic induction antennas and the corresponding second connection line, wherein each of the second electromagnetic induction antennas is electrically connected to the corresponding second connection line through the through hole.

Further, the display panel further comprises an array substrate, a gate insulating layer, a passivation layer, and an organic insulating layer which are stacked in sequence, wherein a side of the array substrate is provided with the second sensing antenna and the gate electrode of the thin film transistor.

Further, a side of the gate insulating layer away from the array substrate is provided with the first electromagnetic induction antenna and an active layer of the thin film transistor, wherein the side of the gate insulating layer away from the array substrate is provided with the first connection line or the second connection line.

According to another aspect of the present application, the present application also provides a terminal device including the display panel.

Beneficial Effect of Invention

Beneficial Effect

In a display panel provided in the present application, a first electromagnetic antenna group and a second electromagnetic antenna group are disposed inside the display panel, wherein a plurality of first electromagnetic induction antennas are disposed in the first electromagnetic antenna group, at least two of the first electromagnetic induction antennas in the first electromagnetic antenna group are electrically connected in the non-display region; and wherein a plurality of second electromagnetic induction antennas are disposed in the second electromagnetic antenna group, at least two of the second electromagnetic induction antennas in the second electromagnetic antenna group are electrically connected in the non-display region. According to various aspects of the present application, at least two first electromagnetic induction antennas and at least two second electromagnetic induction antennas can be connected in parallel in the non-display region to further reduce the resistance of the antenna channel, to improve an effect of the parallel connection of the antennas and enhance a strength of the electromagnetic signal, thereby reducing a probability of touch failure while increasing an aperture ratio of the display panel.

BRIEF DESCRIPTION OF DRAWINGS

The technical solutions and other beneficial effects of the present application will be apparent through the detailed description of the specific embodiments of the present application in conjunction with the accompanying figures.

Figure 1:
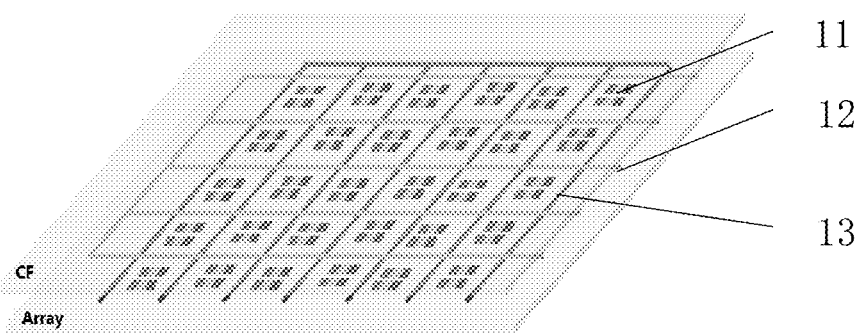
FIG. 1 shows a schematic diagram of a display panel according to one embodiment of the present application.

EMBODIMENTS OF INVENTION
EMBODIMENTS OF THE INVENTION

The technical solutions in the embodiments of the present application will be clearly and completely described below with reference to the accompanying figures in the embodiments of the present application. Obviously, the described embodiments are only a part of the embodiments of the present application, but not all of the embodiments. Based on the embodiments in the present application, all other embodiments obtained by those skilled in the art without inventive steps fall within a protection scope of the present application.

In the description of the present application, it should be understood that the terms "center", "longitudinal", "lateral", "length", "width", "thickness", "upper", "lower", "front", "rear", "left", "right", "vertical", "horizontal", "top", "bottom", "inside", "outside", etc. indicate an orientation or positional relationship based on the orientation or position shown in the figures. The relation is only for a convenience of describing the present application and simplifying the description, rather than indicating or implying that the device or element referred to must have a unique orientation, be constructed and operated with a specific orientation, and therefore cannot be interpreted as a limitation to the present application. In addition, the terms "first" and "second" are only used for descriptive purposes, and should not be understood as indicating or implying relative importance or indicating the number of indicated technical features. Thus, a feature defined as "first", "second" may explicitly or implicitly include one or more features. In the description of the present application, "plurality" means two or more, unless otherwise expressly and specifically defined.

In the description of the present application, it should be noted that, unless otherwise expressly specified and limited, the terms "installed", "connected" and "amounted" should be understood in a broad sense, for example, it may be a fixed connection, a detachable connection, or an integral connection; it can be a mechanical connection, an electrical connection or can be communicate with each other; it can be a direct connection or an indirect connection through an intermediate medium; it can be an internal communication of two elements or an interaction of two elements relation. For those of ordinary skill in the art, the specific meanings of the above terms in the present application can be understood according to specific situations.

The following disclosure provides many different embodiments or examples for implementing different structures of the present application. To simplify the disclosure of the present application, the components and arrangements of specific examples are described below. Of course, they are only examples and are not intended to limit the application. Furthermore, the present application may repeat reference numerals and/or reference letters in different instances for a purpose of simplicity and clarity, and does not in itself indicate a relationship between the various embodiments and/or arrangements discussed. In addition, the present application provides examples of various specific processes and materials, but one of ordinary skill in the art will recognize the present application of other processes and/or the use of other materials. In some embodiments, methods, means, components and circuits well known to those skilled in the art have not been described in detail, to highlight a subject matter of the present application.

The present application mainly provides a display panel. The display panel includes a display region and a non-display region. A pixel unit array and a touch electromagnetic antenna group are disposed in the display region. The pixel unit array includes a plurality of pixel units arranged in an array. The touch electromagnetic antenna group includes a plurality of first electromagnetic antenna groups arranged along a first direction and a plurality of second electromagnetic antenna groups arranged along a second direction. The second electromagnetic antenna group is insulated from the first electromagnetic antenna group. Each first electromagnetic antenna group includes at least two first electromagnetic induction antennas. The first electromagnetic induction antennas are disposed adjacent to the pixel unit in the display region. At least two of the first electromagnetic induction antennas in the first electromagnetic antenna group are electrically connected in the non-display region. Each second electromagnetic antenna group includes at least two second electromagnetic induction antennas. The second electromagnetic induction antennas are disposed adjacent to the pixel unit in the display region. At least two of the second electromagnetic induction antennas in the second electromagnetic antenna group are electrically connected in the non-display region.

In the display panel provided in the present application, a first electromagnetic antenna group and a second electromagnetic antenna group are disposed inside the display panel, wherein a plurality of first electromagnetic induction antennas are disposed in the first electromagnetic antenna group, at least two of the first electromagnetic induction antennas in the first electromagnetic antenna group are electrically connected in the non-display region; and wherein a plurality of second electromagnetic induction antennas are disposed in the second electromagnetic antenna group, at least two of the second electromagnetic induction antennas in the second electromagnetic antenna group are electrically connected in the non-display region. Therefore, at least two first electromagnetic induction antennas and at least two second electromagnetic induction antennas in the display panel provided in the present application can be connected in parallel in the non-display region to further reduce a resistance of the antenna channel, an effect of the parallel connection of the antennas and a strength of the electromagnetic signal can be improved, thereby reducing a probability of touch failure while increasing an aperture ratio of the display panel.

FIG. 1 shows a schematic diagram of a display panel according to one embodiment of the present application.

As shown in FIG. 1, the display panel of the embodiment of the present application includes a plurality of pixel unit arrays arranged in rows and columns. The pixel unit arrays are located between an array substrate and a color filter substrate. 11 is a pixel unit in the pixel unit array. X antenna 12 and Y antenna 13 are disposed between the array substrate and the color filter substrate. Exemplarily, the X antenna may be an antenna in the first electromagnetic antenna group, and the Y antenna may be an antenna in the second electromagnetic antenna group. In the prior art, the electromagnetic film is arranged below the pixel unit array (that is, a backlight side), the antenna is disposed outside a plane, and there is only one antenna for each channel, which cause a resistance value of a corresponding channel is very large and exceeds a range of the electromagnetic signal that can be sensed normally, therefore the electromagnetic signal cannot be detected normally, resulting in a failure of the touch function. Compared with the prior art, at least two first electromagnetic induction antennas are connected in parallel in the non-display region in the present application, further reducing a resistance of the antenna channel, improving an effect of the parallel connection of the antennas, and enhancing a strength of the electromagnetic signal, thereby reducing a probability of touch failure while increasing an aperture ratio of the display panel.

Figure 2:
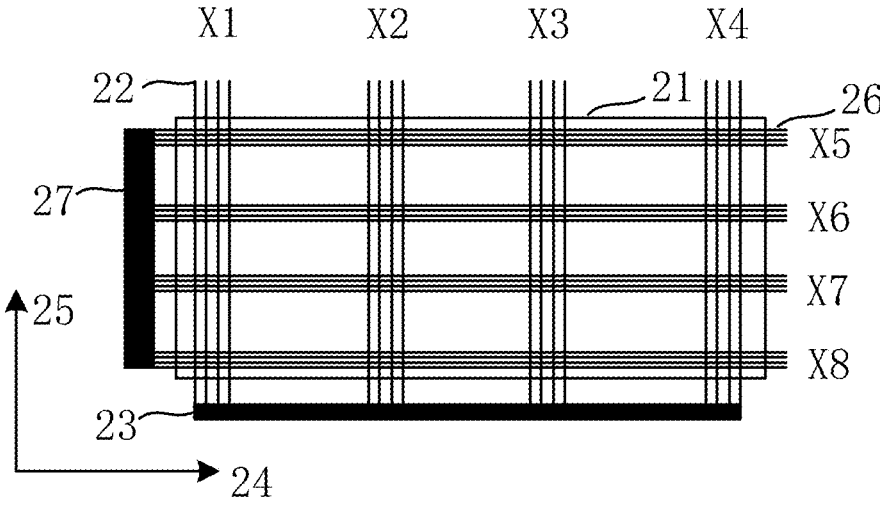
FIG. 2 shows a schematic diagram of a first electromagnetic antenna group and a second electromagnetic antenna group according to one embodiment of the present application.

FIG. 2 shows a schematic diagram of a first electromagnetic antenna group and a second electromagnetic antenna group according to one embodiment of the present application.

As shown in FIG. 2, 21 is a display region. A non-display region (not shown in FIG. 2) is provided around the display region 21. The display region is a region corresponding to the pixel unit array, and is configured to display images. The non-display region is provided with touch chips, peripheral lines, and the like.

Referring to FIG. 2, the first electromagnetic antenna group in the embodiment of the present application includes a plurality of first electromagnetic induction antennas. The first electromagnetic induction antenna 22 is any one of the first electromagnetic induction antennas. The first electromagnetic induction antenna 22 is electrically connected to other first electromagnetic induction antennas through the peripheral line 23 of the non-display region.

Exemplarily, in FIG. 2, the first electromagnetic antenna group X1, the first electromagnetic antenna group X2, the first electromagnetic antenna group X3, and the first electromagnetic antenna group X4 are arranged in sequence. Each first electromagnetic antenna group is provided with four first electromagnetic induction antennas.

Further, the second electromagnetic antenna group in the embodiment of the present application includes a plurality of second electromagnetic induction antennas. The second electromagnetic induction antenna 26 is any one of second electromagnetic induction antenna. The second electromagnetic induction antenna 26 is electrically connected to other second electromagnetic induction antennas through the peripheral line 27 of the non-display region.

Exemplarily, in FIG. 2, the second electromagnetic antenna group X5, the second electromagnetic antenna group X6, the second electromagnetic antenna group X7, and the second electromagnetic antenna group X8 are arranged in sequence. Each second electromagnetic antenna group is provided with four second electromagnetic induction antennas.

It should be noted that, the non-display region can be provided with a touch chip in the present application. The touch chip is electrically connected to each antenna through a plurality of touch lines. For example, the first electromagnetic induction antenna 22 is bonded to the pins of the touch chip through a touch line. It can be understood that the present application mainly focuses on an arrangement of the antennas, and the present application does not limit how each antenna is electrically connected to the touch chip.

Exemplarily, the first electromagnetic antenna group X1, the peripheral line 23, the first electromagnetic antenna group X4, and the touch chip form a complete antenna channel (or called an antenna loop). The first electromagnetic antenna group X2, the peripheral line 23, the first electromagnetic antenna group X5 (not shown in the figure), and the touch chip can form another complete antenna channel. Since the plurality of first electromagnetic induction antennas are connected in parallel through the peripheral line, a resistance value of the antenna channel of the present application is reduced, and a strength of the electromagnetic signal is enhanced. Therefore, compared with the related art, the present application does not need to increase a film thickness in order to reduce a loss of the aperture ratio, and a better touch effect can be achieved under a condition of being compatible with the currently manufacturing process.

Further, a distance between each first electromagnetic antenna group and the adjacent first electromagnetic antenna group is greater than a distance between each first electromagnetic induction antenna and the adjacent first electromagnetic induction antenna. Each second electromagnetic antenna group is adjacent to the adjacent first electromagnetic induction antenna. A distance between the second electromagnetic antenna groups is greater than a distance between each second electromagnetic induction antenna and the adjacent second electromagnetic induction antenna. For example, in FIG. 2, a distance between the first electromagnetic antenna group X1 and the second electromagnetic antenna group X2 is greater than a distance between the first electromagnetic induction antenna 22 and the adjacent first electromagnetic induction antenna.

Further, in the first electromagnetic antenna group, at least two of the first electromagnetic induction antennas are arranged at intervals along the first direction. Referring to FIG. 2, the first direction is a horizontal direction of the display region, that is, a direction indicated by arrow 24. In each of the first electromagnetic antenna groups, the distances between the first electromagnetic induction antennas may be equal. The distances between each first electromagnetic antenna group and the adjacent first electromagnetic antenna group also are equal.

Further, the antenna group further includes a second electromagnetic antenna group, the second electromagnetic antenna group includes a plurality of second electromagnetic induction antennas, and at least two of the second electromagnetic induction antennas in the second electromagnetic antenna group are electrically connected in the non-display region.

Further, in the second electromagnetic antenna group, at least two of the second electromagnetic induction antennas are arranged at intervals along the second direction, wherein the second direction is perpendicular to the first direction. The second direction and the first direction may not be perpendicular to each other but intersect. Referring to FIG. 2, the second direction may be a vertical direction of the display region, that is, a direction indicated by arrow 25. It can be understood that, since the reference of the direction can be changed, the direction of the present application is exemplary, and does not constitute a limitation on the specific structure of the display panel.

It should be noted that, for any first electromagnetic induction antenna or any second electromagnetic induction antenna, the parameters such as a width, a material, and a quantity of each antenna can be adjusted according to actual needs, so that the resistance of the antenna channel can be optimized in different application scenarios. It can be understood that the present application does not limit the parameters such as the width, the material, and the quantity of each antenna itself.

Exemplarily, in the present application, referring to FIG. 2, a part of each of the first electromagnetic induction antennas is positioned in the display region, and another part is positioned in the non-display region. In order to realize an electrical connection with the pins of the touch chip, each of the first electromagnetic induction antennas can extend out of a part of the display region, to facilitate the electrical connection with the pins of the touch chip. In one embodiment of the present application, the second electromagnetic induction antenna and the first electromagnetic induction antenna have similar settings.

In addition, various modifications can be made based on the first electromagnetic induction antenna and the second electromagnetic induction antenna. For example, in FIG. 2, the peripheral lines 23 are placed and moved from a lower side of the illustration to an upper side of the illustration. It can be understood that the present application does not limit various modifications which are made based on the first electromagnetic induction antenna and the second electromagnetic induction antenna.

Further, the first electromagnetic antenna group includes at least one first connection line. The at least one first connection line is electrically connected to each of the first electromagnetic induction antennas in the corresponding first electromagnetic antenna group. For the first electromagnetic induction antenna provided with the first connection line, a plurality of first connection lines corresponding to the first electromagnetic induction antenna are arranged at intervals along the second direction. Each of the first electromagnetic induction antennas may be parallel to each other, and each of the second electromagnetic induction antennas may be parallel to each other.

By electrically connecting at least one of the first electromagnetic induction antennas and/or at least one of the second electromagnetic induction antennas in the non-display region, the embodiment of the present application further reducing the resistance of the antenna channel, improving the effect of parallel connection of the antennas, and enhancing the strength of the electromagnetic signal, thereby reducing the probability of touch failure without sacrificing the aperture ratio of the display panel.

Figure 3:
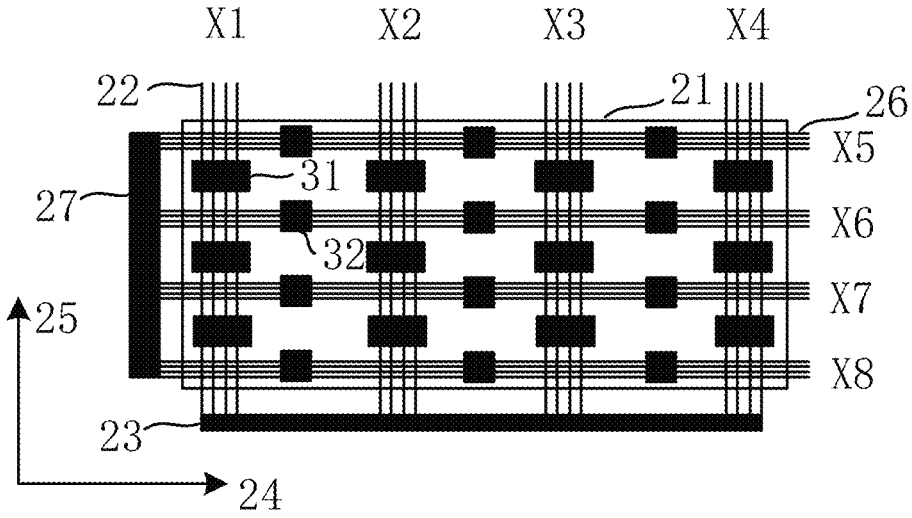
FIG. 3 shows a schematic diagram of a first connection line and a second connection line according to one embodiment of the present application.

FIG. 3 shows a schematic diagram of a first connection line and a second connection line according to one embodiment of the present application.

As shown in FIG. 3, the display region 21 is correspondingly provided with a plurality of first electromagnetic induction antennas, and the first electromagnetic induction antenna 22 may be any one of the first electromagnetic induction antennas. The first electromagnetic induction antenna 22 may be electrically connected to other first electromagnetic induction antennas through the peripheral line 23.

Referring to FIG. 3, the first connection line 31 may be one of the first connection lines of the first electromagnetic induction antenna 22. In FIG. 3, exemplarily, each of the first electromagnetic induction antennas in the first electromagnetic antenna group X1 corresponds to three first connection lines in common. The three first connection lines are arranged at intervals of 25 along the second direction.

Further, the second electromagnetic antenna group includes at least one second connection line. The at least one second connection line is electrically connected to each of the second electromagnetic induction antennas in the corresponding second electromagnetic antenna group. For the second electromagnetic induction antenna provided with the second connection line, a plurality of second connection lines corresponding to the second electromagnetic induction antenna are arranged at intervals along the first direction.

Referring to FIG. 3, the second connection line 32 may be one of the second connection lines of the second electromagnetic induction antenna 26. In FIG. 3, exemplarily, each of the second electromagnetic induction antennas in the second electromagnetic antenna group X5 corresponds to three second connection lines in common. The three second connection lines are arranged at intervals along the first direction 24.

Further, both the first connection line and the second connection line may be, for example, metal traces, metal blocks, or any other possible forms. The second connection line may be the same as or different from the first connection line. For example, the shape, area, and position of the second connection line may be different from the first connection line. It can be understood that the second electromagnetic induction antenna may have a similar arrangement to the first electromagnetic induction antenna in FIG. 3. Regarding the setting of the second connecting line in the second electromagnetic induction antenna, reference may be made to the setting of the first connecting line.

In practice, since the resistance of the antenna in the present application is less than the prior art, the corresponding current or voltage will be generated in the antenna loop by the antenna at the corresponding position when the touch device such as a stylus moves, and then sent to the touch chip for further processing, so that the specific position of the touch device can be located. It can be understood that the present application does not limit how to further process the electromagnetic signal related to the antenna.

By disposing a corresponding first connection line on at least one of the first electromagnetic induction antennas, and/or arranging a corresponding second connection line in at least one of the second electromagnetic induction antennas, at least two first electromagnetic induction antennas can be connected in parallel in the non-display region In the embodiment of the present application further reducing the resistance of the antenna channel, improving the effect of the parallel connection of the antennas, and enhancing the strength of the electromagnetic signal, thereby reducing the probability of touch failure while increasing the aperture ratio of the display panel.

Further, each of the pixel units includes a thin film transistor, each of the first electromagnetic induction antennas, and a source electrode or a drain electrode of the corresponding thin film transistor are disposed on a same layer, and each of the second electromagnetic induction antennas and a gate electrode of the corresponding thin film transistor are disposed on a same layer.

Figure 4:
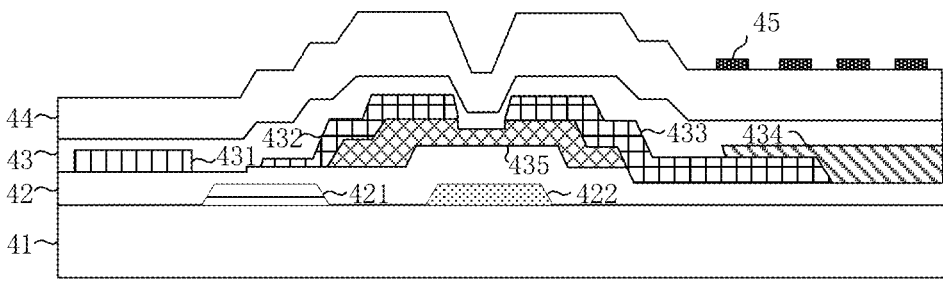
FIG. 4 shows a schematic structural diagram of the display panel according to one embodiment of the present application.

FIG. 4 shows a schematic structural diagram of a display panel according to one embodiment of the present application.

As shown in FIG. 4, exemplarily, the display panel of the embodiment of the present application includes an array substrate 41, a gate insulating layer 42, a passivation layer 43, and an organic insulating layer 44 that are stacked in sequence.

A second electromagnetic induction antenna 421 and a gate electrode layer 422 are disposed on one side of the array substrate. The gate electrode layer 422 may be a gate electrode of the thin film transistor in one pixel unit. The second electromagnetic induction antenna 421 and the gate electrode layer 422 are positioned in the gate insulating layer 42.

Referring to FIG. 4, a first electromagnetic induction antenna 431 and an active layer 435 are provided on one side of the gate insulating layer facing away from the array substrate. A material used for the active layer 435 may be a photosensitive material, such as hydrogenated amorphous silicon (α-Si:H) or a mixed doping of Ge and Si—Ge. A source electrode layer 432 and a drain electrode layer 433 of the thin film transistor may be covered on a side of the active layer 435 away from the array substrate. Both the first electromagnetic induction antenna and the source electrode or the drain electrode of the corresponding thin film transistor may be positioned in the passivation layer. Of course, since the types of thin film transistors can be N-type and P-type, 432 in FIG. 4 can be the drain electrode layer of the thin film transistor, and 433 in FIG. 4 can be the source electrode layer of the thin film transistor.

Further, referring to FIG. 4, a connection region 434 may be provided on the side of the gate insulating layer facing away from the array substrate. The connection region may partially cover the source electrode or the drain electrode of the corresponding thin film transistor, and may also partially cover the gate insulating layer. The connection region 434 may be disposed in the passivation layer.

Further, the connection region 434 in FIG. 4 may be the first connection line or the second connection line. In practical applications, both the first connection line and the second connection line may be indium tin oxide (ie, ITO) electrodes. In addition, on the side of the organic insulating layer facing away from the array substrate, a plurality of common electrodes 45 may also be provided.

Further, through holes are provided between each of the first electromagnetic induction antennas and the corresponding first connection lines. Each of the first electromagnetic induction antennas is electrically connected to the corresponding first connection lines through the through hole. Through holes are provided between the second electromagnetic induction antenna and the corresponding second connection line. Each of the second electromagnetic induction antennas is electrically connected to the corresponding second connection line through the through hole.

Referring to FIG. 4, the first electromagnetic induction antenna 431 and the second electromagnetic induction antenna 421 may be electrically connected to the connection region 434 through the through holes. It can be understood that, in the present application, a shape and a position of the through hole can be determined according to the actual situation, and the present application does not limit the shape and position of the through hole.

It should be noted that FIG. 4 is only a part of the display panel. For the touch display panel, other parts such as a light control sensing unit and a substrate layer may also be disposed inside the display panel, and the present application does not limit other parts of the display panel. In addition, the present application can be designed based on an integrated touch screen (One Glass Solution, OGS) and an integrated in-cell touch. The specific types and application scenarios of the display panel are not limited.

Since the thin film transistor and the antenna in FIG. 4 can be disposed between the array substrate and the color filter substrate. That is, the display panel is disposed in an In-Cell mode, the present application can reduce the thickness of the display panel and lower the cost.

In addition, the present application provides a terminal device including the display panel. For specific settings of the terminal device, reference may be made to the display panel, and details are not repeated here.

To sum up, in the embodiment of the present application, a first electromagnetic antenna group and a second electromagnetic antenna group are disposed inside the display panel, wherein a plurality of first electromagnetic induction antennas are disposed in the first electromagnetic antenna group, at least two of the first electromagnetic induction antennas in the first electromagnetic antenna group are electrically connected in the non-display region; and wherein a plurality of second electromagnetic induction antennas are disposed in the second electromagnetic antenna group, at least two of the second electromagnetic induction antennas in the second electromagnetic antenna group are electrically connected in the non-display region, which can further reduce the resistance of the antenna channel, improve an effect of the parallel connection of the antennas, and enhance a strength of the electromagnetic signal, thereby reducing a probability of touch failure while increasing an aperture ratio of the display panel and is compatible with the current process technology. In addition, the embodiment of the application designs the external electromagnetic film as an In-Cell structure, which reduces a cost of mold opening and increases an added value of the panel, and especially suitable for liquid crystal display panels.

In the above-mentioned embodiments, the description of each embodiment has its own emphasis. For parts that are not described in detail in a certain embodiment, reference may be made to the relevant descriptions of other embodiments.

The display panels and terminal devices provided by the embodiments of the present application are described in detail above. The principles and implementations of the present application are described in this article by using specific examples. The descriptions of the above embodiments are only used to help understand the technology, scheme, and core idea of the present application. Those of ordinary skill in the art should understand that: It is still possible to modify the technical solutions recorded in the foregoing embodiments, or perform equivalent replacements to some of the technical features. However, these modifications or replacements do not make the essence of the corresponding technical solutions deviate from the scope of the technical solutions of the embodiments of the present application.

What is claimed is:

1. A display panel comprising a display region and a non-display region, wherein a pixel unit array and a touch electromagnetic antenna group are disposed in the display region;

wherein the pixel unit array comprises a plurality of pixel units arranged in an array;

wherein the touch electromagnetic antenna group comprises a plurality of first electromagnetic antenna groups arranged along a first direction and a plurality of second electromagnetic antenna groups arranged along a second direction, and wherein the second electromagnetic antenna group is insulated from the first electromagnetic antenna group;

wherein each first electromagnetic antenna group comprises at least two first electromagnetic induction antennas, wherein the first electromagnetic induction antennas are disposed adjacent to the pixel unit in the display region, and wherein at least two of the first electromagnetic induction antennas in the first electromagnetic antenna group are electrically connected in the non-display region;

wherein each second electromagnetic antenna group comprises at least two second electromagnetic induction antennas, wherein the second electromagnetic induction antennas are disposed adjacent to the pixel unit in the display region, and wherein at least two of the second electromagnetic induction antennas in the second electromagnetic antenna group are electrically connected in the non-display region; and wherein a distance between each first electromagnetic antenna group and the adjacent first electromagnetic antenna group is greater than a distance between each first electromagnetic induction antenna and the adjacent first electromagnetic induction antenna, and wherein a distance between each second electromagnetic antenna group and the adjacent second electromagnetic antenna group is greater than a distance between each second electromagnetic induction antenna and the adjacent second electromagnetic induction antenna.

2. The display panel according to claim 1, wherein at least two of the first electromagnetic induction antennas are arranged at intervals along the first direction in the first electromagnetic antenna group.

3. The display panel according to claim 2, wherein at least two of the second electromagnetic induction antennas are arranged at intervals along the second direction in the second electromagnetic antenna group, and wherein the second direction is perpendicular to the first direction.

4. The display panel according to claim 3, wherein the first electromagnetic antenna group comprises at least one first connection line, wherein the at least one first connection line is electrically connected to each of the first electromagnetic induction antennas in the corresponding first electromagnetic antenna group, and wherein for the first electromagnetic induction antenna provided with the first connection line, a plurality of first connection lines corresponding to the first electromagnetic induction antenna are arranged at intervals along the second direction.

5. The display panel according to claim 4, wherein the second electromagnetic antenna group comprises at least one second connection line, wherein the at least one second connection line is electrically connected to each second electromagnetic induction antenna of the corresponding second electromagnetic antenna groups, and wherein for the second electromagnetic induction antenna provided with the second connection line, a plurality of second connection lines corresponding to the second electromagnetic induction antenna are arranged at intervals along the first direction.

6. The display panel according to claim 1, wherein each of the first electromagnetic induction antennas is partially positioned in the display region, wherein the lengths of the first electromagnetic induction antennas positioned in the display region are equal.

7. The display panel according to claim 1, wherein each of the second electromagnetic induction antennas is partially positioned in the display region, and wherein the lengths of the second electromagnetic induction antennas positioned in the display region are equal.

8. The display panel according to claim 1, wherein the display panel further comprises a first peripheral line, and wherein at least two of the first electromagnetic induction antennas are electrically connected to the first peripheral line in the non-display region in the first electromagnetic antenna group.

9. The display panel according to claim 8, wherein a width of the first peripheral line is greater than a width of each of the first electromagnetic induction antennas, wherein a line direction of the first peripheral line is perpendicular to a line direction of the first electromagnetic induction antenna.

10. The display panel according to claim 1, wherein the display panel further comprises a second peripheral line, and wherein at least two of the second electromagnetic induction antennas are electrically connected to the second peripheral line in the non-display region in the second electromagnetic antenna group.

11. The display panel according to claim 10, wherein a width of the second peripheral line is greater than a width of each of the second electromagnetic induction antennas, and wherein a line direction of the second peripheral line is perpendicular to a line direction of the first electromagnetic induction antenna.

12. The display panel according to claim 1, wherein a touch chip is disposed in the non-display region, and the touch chip is electrically connected to each of the first electromagnetic induction antennas and each of the second electromagnetic induction antennas.

13. The display panel according to claim 12, wherein the display panel comprises a plurality of antenna loops, and wherein each of the antenna loops comprises at least two first electromagnetic induction antennas or at least two second electromagnetic induction antennas.

14. A terminal device, wherein the terminal device comprises the display panel according to claim 1.

15. A display panel comprising a display region and a non-display region, wherein a pixel unit array and a touch electromagnetic antenna group are disposed in the display region;
    wherein the pixel unit array comprises a plurality of pixel units arranged in an array;

wherein the touch electromagnetic antenna group comprises a plurality of first electromagnetic antenna groups arranged along a first direction and a plurality of second electromagnetic antenna groups arranged along a second direction, and wherein the second electromagnetic antenna group is insulated from the first electromagnetic antenna group;
wherein each first electromagnetic antenna group comprises at least two first electromagnetic induction antennas, wherein the first electromagnetic induction antennas are disposed adjacent to the pixel unit in the display region, and wherein at least two of the first electromagnetic induction antennas in the first electromagnetic antenna group are electrically connected in the non-display region;
wherein each second electromagnetic antenna group comprises at least two second electromagnetic induction antennas, wherein the second electromagnetic induction antennas are disposed adjacent to the pixel unit in the display region, and wherein at least two of the second electromagnetic induction antennas in the second electromagnetic antenna group are electrically connected in the non-display region; and
wherein each of the pixel units comprises a thin film transistor, each of the first electromagnetic induction antennas and a source electrode or a drain electrode of a corresponding thin film transistor are disposed on a same layer, and each of the second electromagnetic induction antennas and a gate electrode of a corresponding thin film transistor are disposed on a same layer.

16. The display panel according to claim 15, wherein the first electromagnetic antenna group comprises at least one first connection line, wherein the at least one first connection line is electrically connected to each of the first electromagnetic induction antennas in the corresponding first electromagnetic antenna group, and wherein for the first electromagnetic induction antenna provided with the first connection line, a plurality of first connection lines corresponding to the first electromagnetic induction antenna are arranged at intervals along the second direction; and
    wherein the second electromagnetic antenna group comprises at least one second connection line, wherein the at least one second connection line is electrically connected to each second electromagnetic induction antenna of the corresponding second electromagnetic antenna groups, and wherein for the second electromagnetic induction antenna provided with the second connection line, a plurality of second connection lines corresponding to the second electromagnetic induction antenna are arranged at intervals along the first direction.

17. The display panel according to claim 16, wherein a through hole is provided between each of the first electromagnetic induction antennas and a corresponding first connection line, and wherein the first electromagnetic induction antennas is electrically connected to the corresponding first connection line through the through hole.

18. The display panel according to claim 16, wherein a through hole is provided between each of the second electromagnetic induction antennas and a corresponding second connection line, and wherein the second electromagnetic induction antennas is electrically connected to the corresponding second connection line through the through hole.

19. The display panel according to claim 16, wherein the display panel further comprises an array substrate, a gate insulating layer, a passivation layer, and an organic insulating layer which are stacked in sequence, wherein one side of the array substrate is provided with the second electromagnetic induction antenna and the gate electrode of the thin film transistor.

20. The display panel according to claim 19, wherein a side of the gate insulating layer away from the array substrate is provided with the first electromagnetic induction antenna and an active layer of the thin film transistor, wherein a side of the gate insulating layer away from the array substrate is provided with the first connection line or the second connection line.

* * * * *